United States Patent Office 3,551,993
Patented Jan. 5, 1971

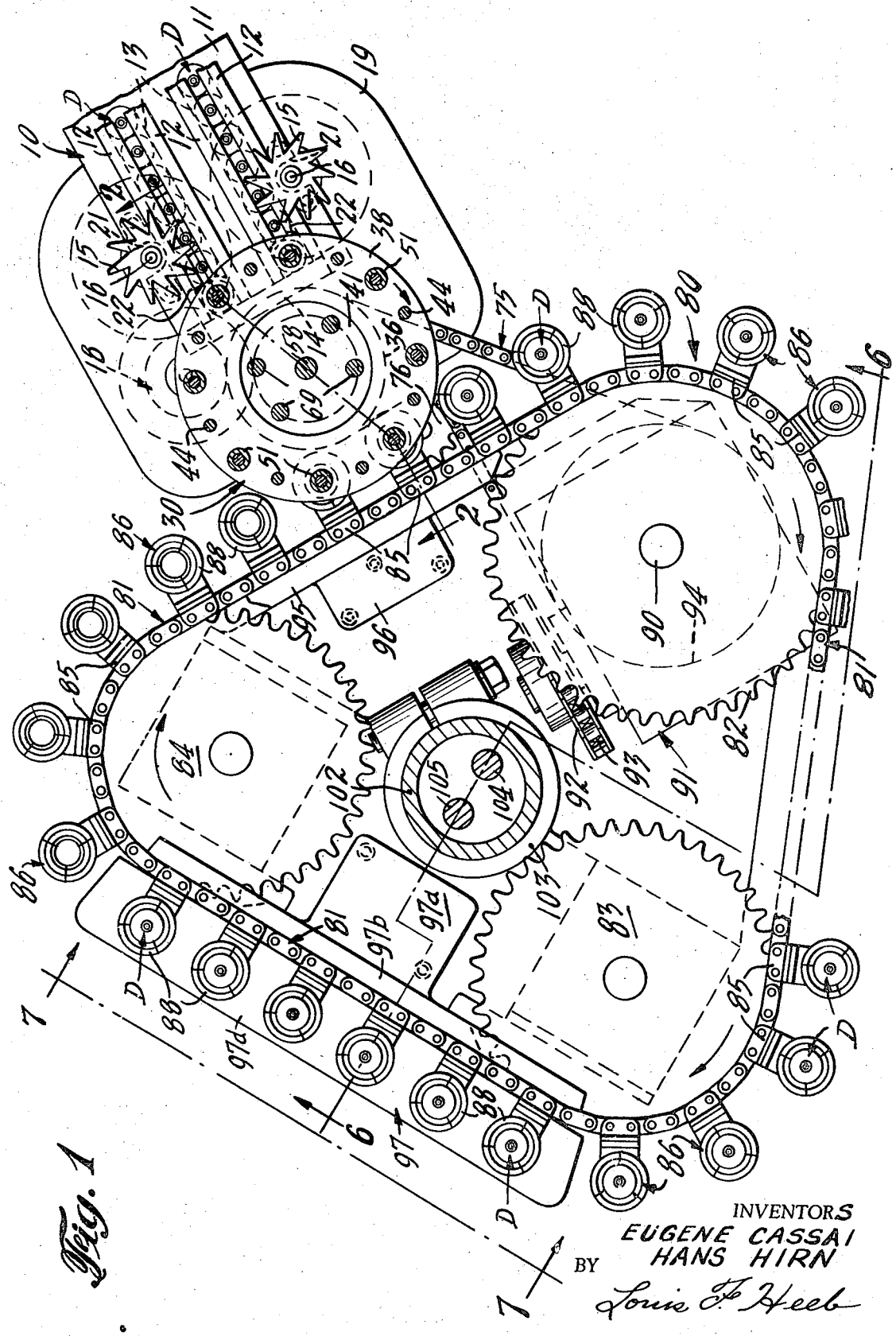

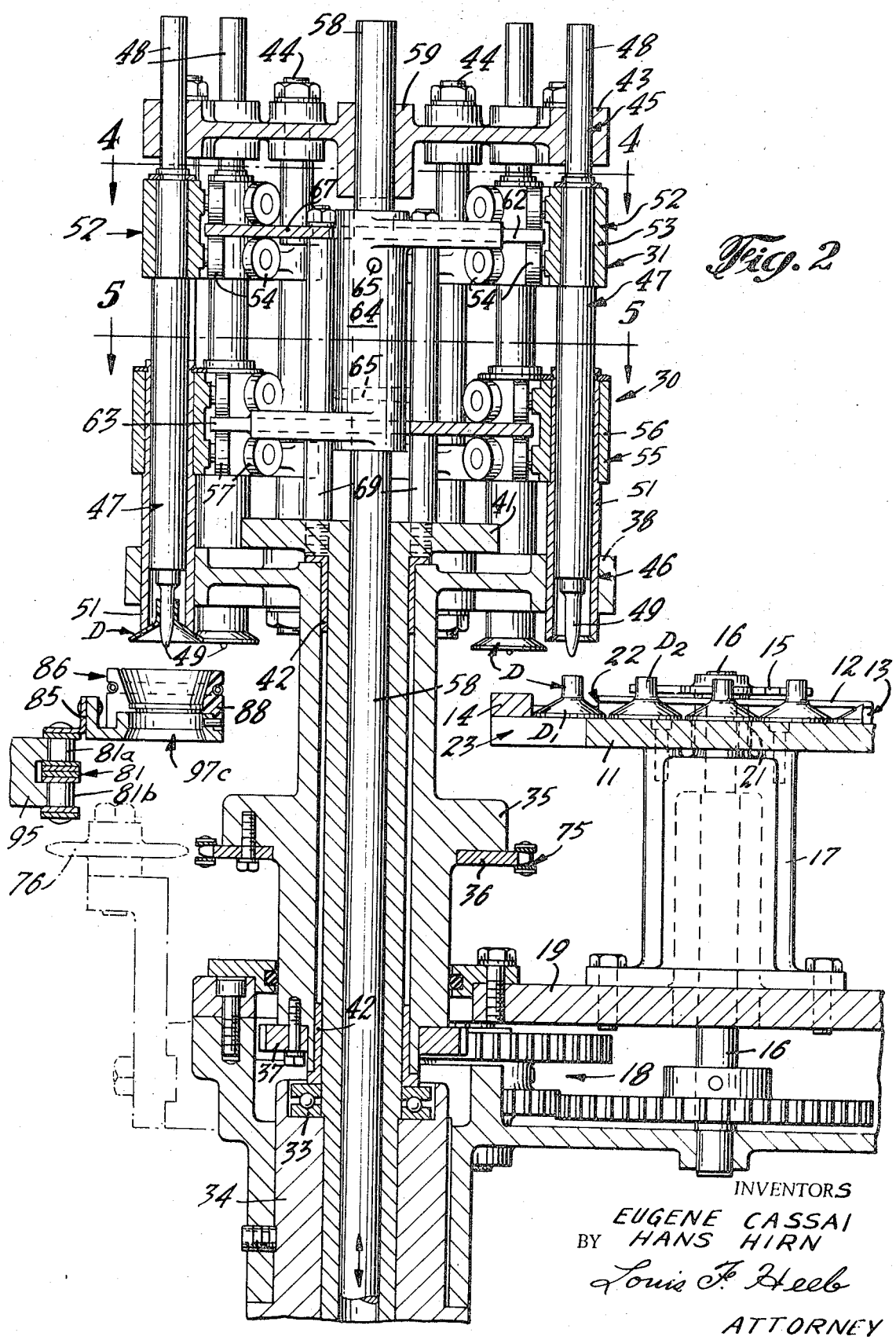

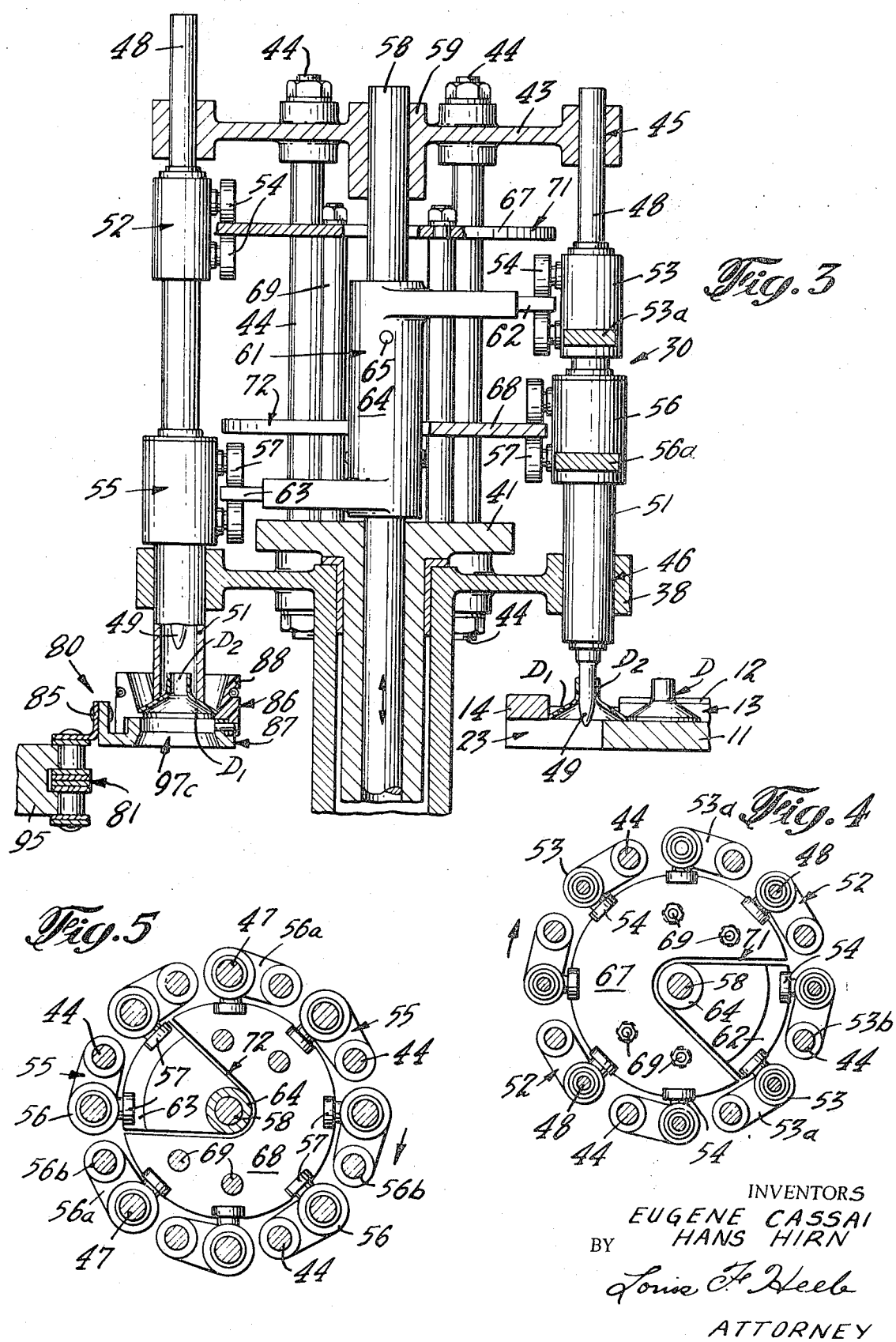

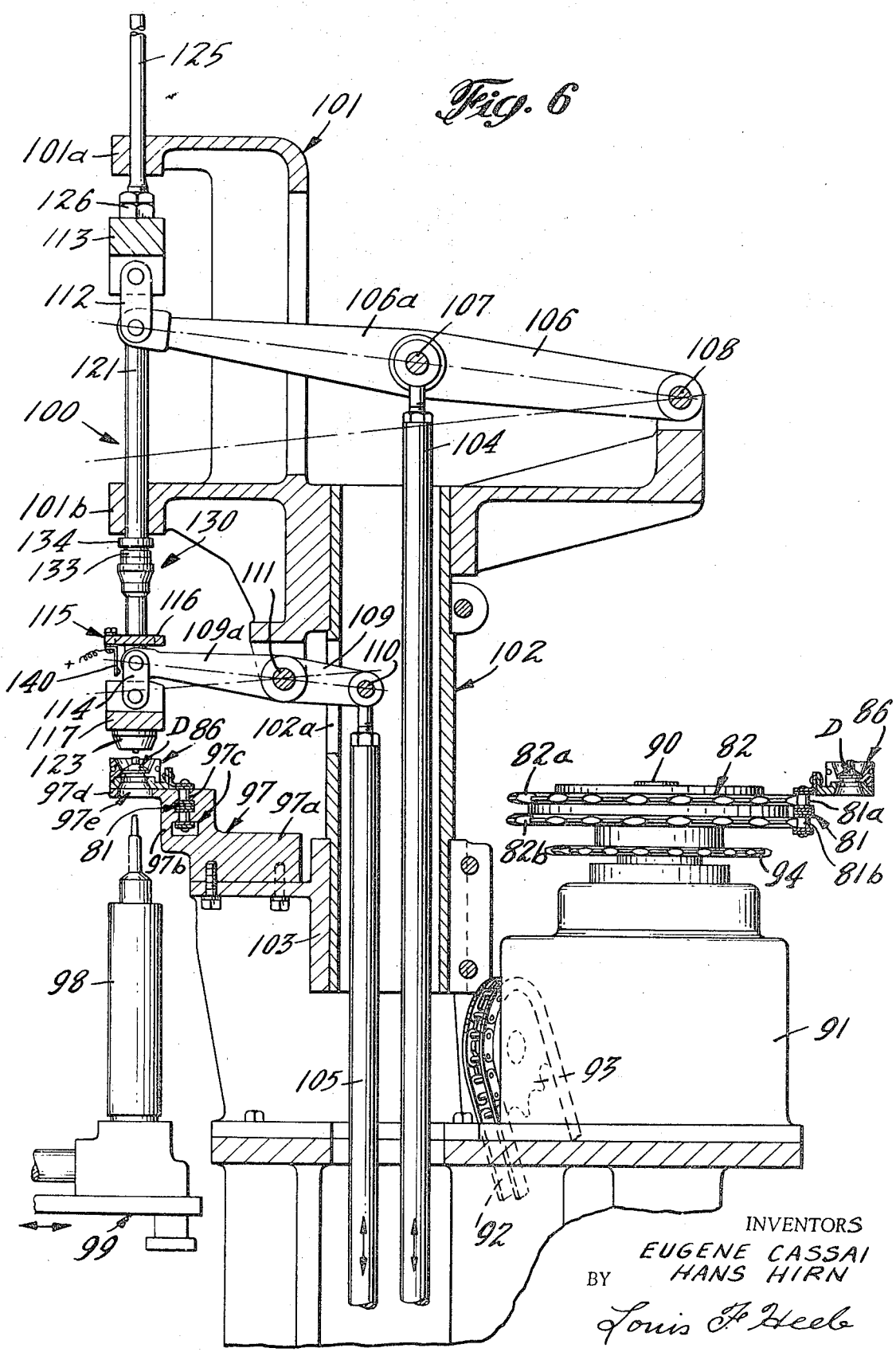

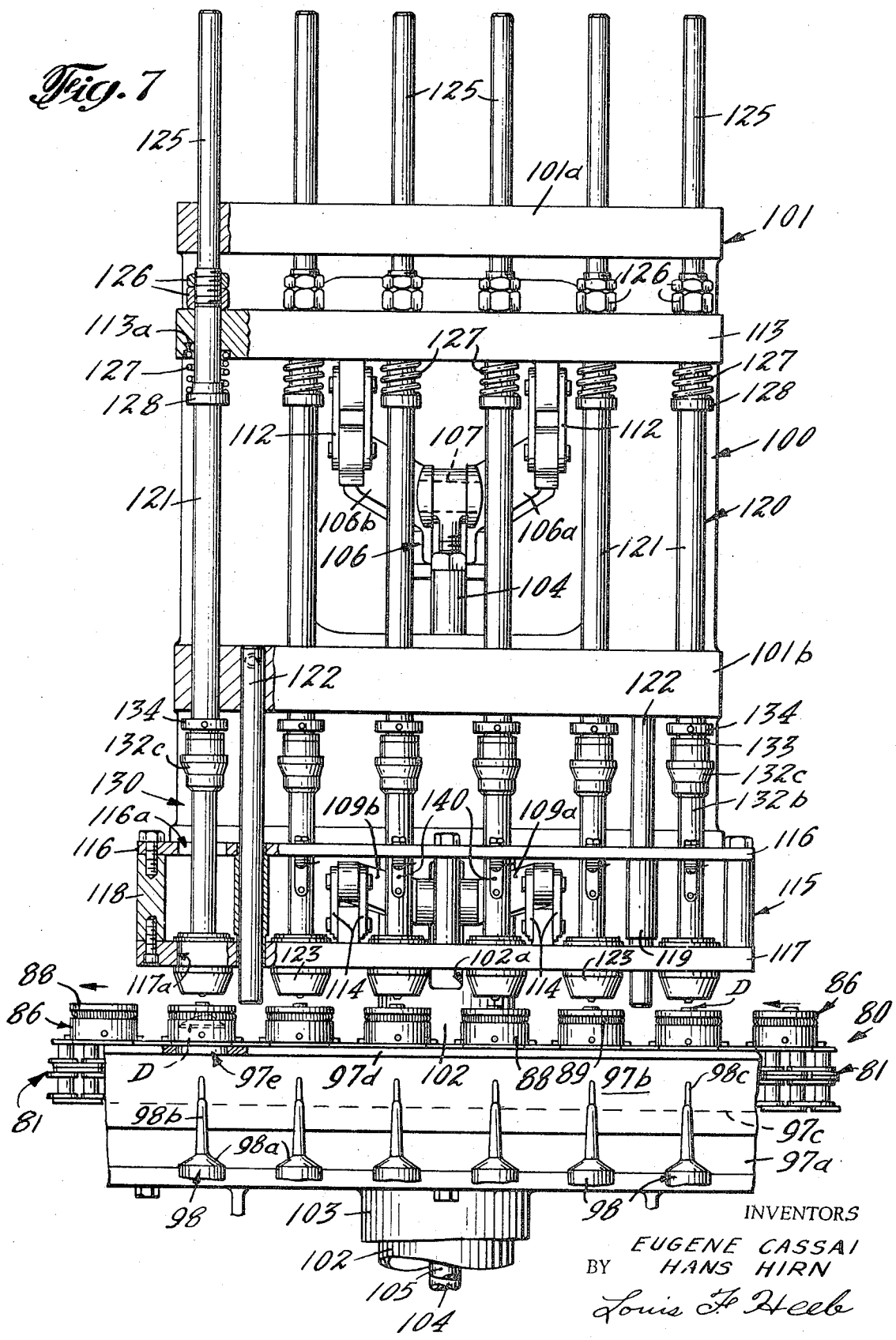

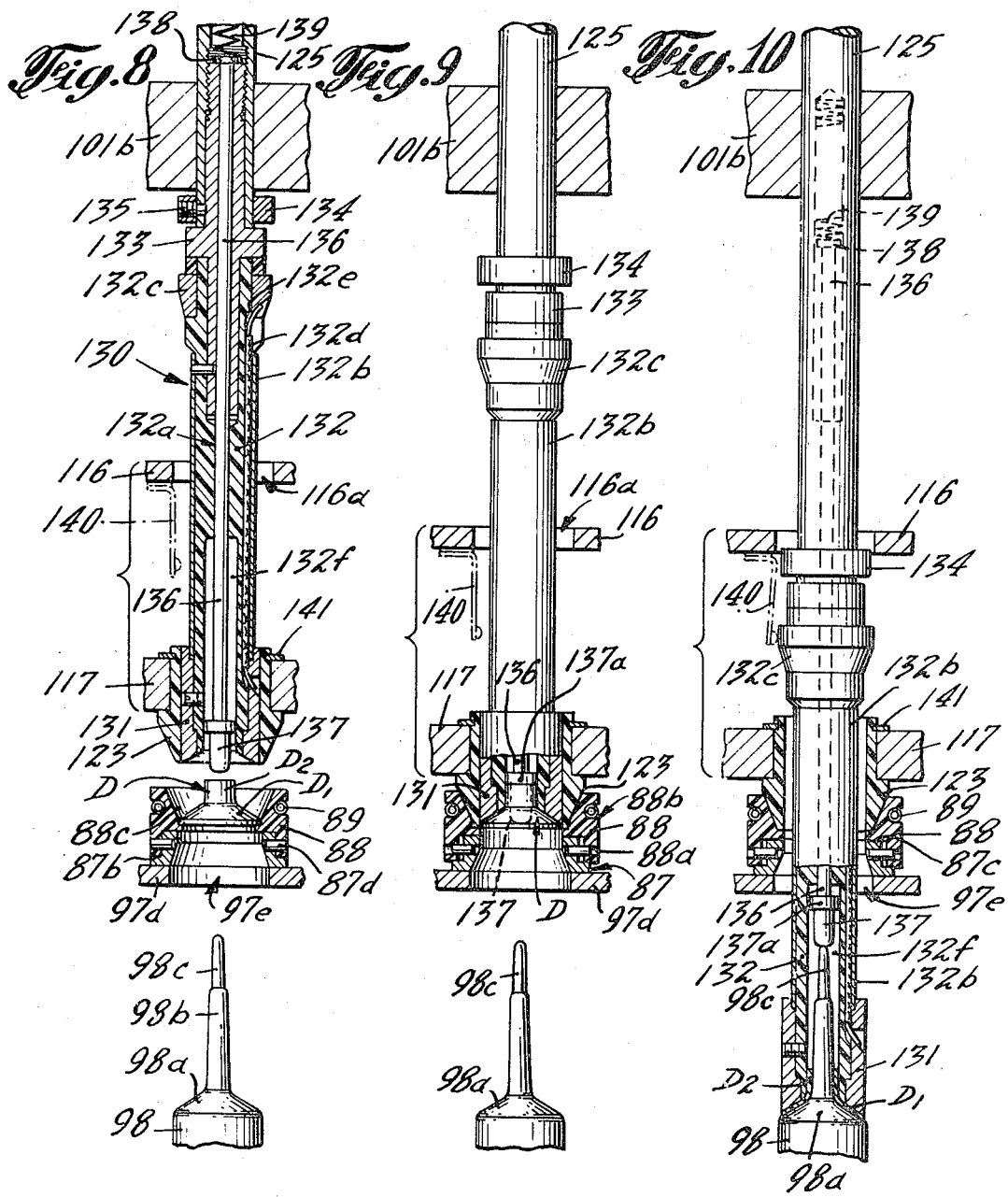

1

3,551,993
MACHINE AND METHOD FOR HANDLING
WORKPIECES
Eugene Cassai, Oakland, and Hans Hirn, Iselin, N.J., assignors to American Can Company, New York, N.Y., a corporation of New Jersey
Filed July 25, 1968, Ser. No. 747,627
Int. Cl. B23p 19/00, 19/04; B23q 17/00
U.S. Cl. 29—429
17 Claims

ABSTRACT OF THE DISCLOSURE

The invention relates to a machine and method for supplying and positioning disc shaped container headpiece barrier members into a container fabricating machine. The disc members are received by a dual feed unit from a conventional hopper and feed seriatim in two rows into an indexing turret which transfers the disc members to an indexing chain unit. A disc inserting unit located at a station remote from the indexing turret strips the disc members from the indexing chain unit and positions them onto awaiting tools of a molding machine in order that the disc members may become assembled with other components to form articles of manufacture.

BACKGROUND OF THE INVENTION

A particular use contemplated for the machine and method of this invention is in the manufacture of containers, and especially containers of the type known as collapsible tubes. Recent developments in this field relate to container construction which utilize various combinations of materials in composite or laminated form, such as polyethylene or other types of thermoplastic material in combination with paper, metal foil and other substrate materials. These containers are designed to achieve high product protection against flavor loss and oxygen permeation. Such containers are provided with a headpiece of thermoplastic material, usually a molding, which is assembled to the container body by one of several known procedures.

The headpiece, being thermoplastic, is susceptible to product and oxygen permeation, and means have been devised for overcoming this problem. See, for example, U.S. Pats. 3,260,411 and 3,260,777, which describe various forms of barrier members associated with the headpiece component of collapsible tubes.

The present invention is specifically directed to a mechanism and the operative steps required for the supplying and positioning of such barrier members in the container fabricating machine.

SUMMARY OF THE INVENTION

The invention comprises a mechanism and the operative steps for receiving the workpieces from a supply hopper in oriented fashion, feeding the workpieces seriatim to a transfer device which transfers the workpieces to an inserting device, and then transporting a selected number of workpieces in the inserting device into registry with assembly tools in an assembly station.

DESCRIPTION OF THE DRAWINGS

FIG. 1 is a plan view of the apparatus of this invention.
FIG. 2 is a sectional view taken substantially along line 2—2 of FIG. 1.
FIG. 3 is a view similar to FIG. 2, with parts broken away, showing the illustrated mechanism in a different operative position.
FIGS. 4 and 5 are plan views, partly in section, taken substantially along line 4—4 and line 5—5, respectively, of FIG. 2.

2

FIG. 6 is a vertical sectional view, with parts broken away, taken substantially along line 6—6 of FIG. 1.
FIG. 7 is an elevational view as shown along line 7—7 of FIG. 1.
FIGS. 8, 9 and 10 are sectional views of elements, in different operative positions, of the apparatus at the station illustrated in FIG. 7.
FIGS. 11 and 12 are perspective views of other elements of the apparatus located at the station illustrated in FIG. 7.

DESCRIPTION OF THE PREFERRED EMBODIMENT

The particular workpiece for which the inventive apparatus is designed is a container headpiece barrier member of annular configuration (see FIG. 3). This member, hereinafter referred to as disc D, has a compound shape comprising a lower conical portion $D_1$ and an upper cylindrical portion $D_2$.

Referring now to FIGS. 1 and 7, there is illustrated an apparatus comprising a dual feed unit generally designated 10 for feeding two rows of discs D seriatim into the apparatus from a conventional hopper feeder (not shown), an 8-station indexing turret generally designated 30 for receiving the discs from the dual feed unit and transferring them two at a time onto an indexing chain unit generally designated 80, and a disc inserting unit generally designated 100 at a station remote from the indexing turret for stripping the discs from the indexing chain unit and positioning them onto the awaiting tools of a molding machine.

The dual feed unit 10 comprises a slide plate 11 on which are bolted two pairs of L-shaped channel members 12 defining two parallel linear feed slots 13, a cross piece 14 secured to the plate 11 at the exit end of the slots 13 to arrest the discs in a predetermined position at the loading station of the indexing turret 30, and a pair of counter-rotating star wheels 15 for advancing the discs from the slots 13 into abutment against the cross piece 14. As best shown in FIG. 2, each star wheel 15 is mounted on a drive shaft 16 which extends downwardly through a column housing 17 and is driven by means of a suitable gear train, designated by numeral 18, contained in a housing 19. The gear housing is mounted to the support structure of the indexing turret, and the power for the gear train 18 is taken from the drive mechanism for the indexing turret, in the manner to be described hereinafter. Slide plate 11 is mounted in horizontal position on column housings 17 which bolt to gear housing 19. It will be understood that suitable bearings for star wheel shafts 16 are provided in housings 17 and 19. The opposite sides of slide plate 11 and the outermost L-shaped rails are cut away as at 21 around drive shafts 16 to accommodate the hub portions of star wheels 15.

The two rows of discs D are supplied into the feed unit 10 from a commercially available hopper (e.g. "Syntron" Hopper Feeder), in oriented disposition with the conical portion $D_1$ of the disc in sliding contact with plate 11 and the cylindrical portion $D_2$ extending upwardly into slots 13 between each pair of L-shaped channel members 12. The upper surface of the channel members 12 which overlies the conical portions $D_1$ of the discs is cut away adjacent cross piece 14, as more clearly illustrated by numeral 22 in FIG. 2, to enable the discs to be lifted from slide plate 11 by an appropriate plunger mechanism on the indexing turret 30, next to be described. A pair of narrow slots 23 are formed in the exit end of plate 11 directly beneath the channel slots 13, to enable the plunger mechanism to extend a sufficient distance into the discs.

The structure and operation of indexing turret 30 is best illustrated in FIGS. 2 and 3. This unit comprises a plunger head 31 mounted to the upper end of a rotating column 32 which rests on a thrust bearing 33 in a hub 34 on the main frame of the apparatus. Column 32 is provided at its midsection with an enlarged hub 35 to which is bolted a sprocket 36 which provides the drive for the turret in a manner to be described hereinafter. A gear 37 is bolted to the lower end of column 32 adjacent the thrust bearing 33, which gear meshes with and drives gear train 18 of the dual feed unit 10.

The upper end of column 32 is formed with an enlarged circular plate 38 which acts as the support member for plunger head 31. Extending through rotating column 32 is a stationary column 39 fixed at its lower end to the frame of the apparatus (not shown) and provided at its upper end with a smaller circular plate 41 which overlies plate 38 on the rotating column. A pair of bushings 42 on the upper end and midsection of column 39 separate the two columns and provide the means for relative rotation therebetween.

A circular plate 43, similar in form to plate 38 on the rotary column 32, provides the upper support for the plunger head and is rigidly connected to plate 38 by means of a plurality of elongate bolts 44. Both the upper plate 43 and the lower plate 38 are provided with annular peripheral portions of increased thickness, in which thickened portions are a plurality of spaced apertures 45 and 46, respectively. These apertures in each plate are in direct vertical alignment in order to receive, in each pair of apertures, a reciprocating plunger unit 47.

As best shown in FIG. 2, each plunger unit comprises an elongate shaft 48 having a picker finger or tip 49 fixed to its lower end, a stripper sleeve 51 surrounding the lower half of shaft 48 and being relatively slidable therewith, an upper cam follower 52 having a bearing 53 fixed to the shaft 48 and a pair of spaced cam rollers 54 mounted to the bearing 53, and a lower cam follower 55 having a similar bearing 56 fixed to stripper sleeve 51 and a pair of spaced cam rollers 57 mounted to bearing 56. As best shown in FIG. 4, each upper cam bearing 53 has a side extension 53a having at its outer end an aperture 53b through which bolt 44 slidably passes. Similarly, each lower cam bearing 56 has an extension 56a with aperture 56b slidable on the same bolt 44. These sliding connections on bolt 44 serve to maintain the cam rollers 54 and 57 in their proper path of travel. From this description, it will be seen that plunger shaft 48 is free to slide in aperture 43 in upper plate 43 and within stripper sleeve 51 in response to actuation of cam follower 52, and that stripper sleeve 51 is independently slidable in aperture 46 in lower plate 38 on actuation of cam follower 55, which actuation will now be described.

Extending upwardly through stationary column 39 is a reciprocating shaft 58, the upper end of which slides within a journal 59 formed centrally in upper plate 43 and the lower end of which extends below hub 34 on the main frame of the apparatus and is driven by a suitably reciprocating mechanism (not shown) which in turn is driven by the main drive of the apparatus with the desired cycle of actuation. A 2-segment cam track 61 is fixed to shaft 58 adjacent its upper end between upper plate 43 and lower plate 38 with sufficient clearance to allow the desired reciprocation stroke for shaft 58. Track 61 comprises an upper cam segment 62 and lower cam segment 63, each extending radially in diametrically opposite directions from an elongate hub 64 fixed to the shaft 58 by a pair of pins 65. As best shown in FIGS. 4 and 5, cam segments 62 and 63 have an angular dimension of approximately 45°, which angular dimension corresponds to the circumferential spacing in the plunger head 31 of two adjacent plunger units 47 to enable two corresponding sets of cam rollers to be in engaging position on the cam segment in each index position of the plunger head. That is, each plunger unit is advanced two positions for each index movement of the plunger head.

Surrounding shaft 58 and disposed to the inside of the circumferential path of plungers 47 are a pair of stationary cam plates, designated upper plate 67 and lower plate 68, which cam plates are fixed in spaced relation by means of four elongate bolts 69 which extend through each plate into the circular plate 41 on the upper end of stationary column 39. As shown in FIGS. 4 and 5, the stationary cam plates 67 and 68 have portions cut away, as at 71 and 72 respectively, corresponding in angular shape and slightly larger than cam segments 62 and 63 to allow the cam segments to be raised into planar relation therewith.

The plunger units 47 are illustrated in their "up" position in FIG 2. In this position, the upper cam segment 62 has entered space 71 in upper stationary cam plate 67 and forms with said cam plate a full 360° cam surface. Similarly, the lower cam segment 63 enter space 72 in the lower stationary cam plate 68 to form therewith a complete cam circle. This enables the two sets of cam rollers 54 which control the reciproating movement of two adjacent plunger shafts 48, formerly in position on cam segment 62, to be advanced onto stationary cam plate 67 when the plunger head makes one index, and at the same time the next succeeding two sets of cam rollers 54 come into position on cam segment 62. Similarly, the corresponding sets of cam rollers 57, which control the reciprocating movement of two adjacent stripper sleeves 51, advance onto and off the lower cam segment 63 on each indexing of the plunger head.

The "down" position of the plunger units 47 is illustrated in FIG. 3. When shaft 58 descends, cam segment 62 descends with it to lower the upper set of cam followers 53 and, consequently, the two corresponding plunger shafts 48 are caused to descend, thus forcing the two plunger tips downwardly into gripping engagement within the hollow cylindrical portions $D_2$ of the two discs D waiting in the parallel slots 13 against cross bar 14. Plunger tips 49 are preferably of a hard resilient material and are dimensioned so as to firmly frictionally engage the inner wall of disc cylindrical portion $D_2$ and hold it against the force of gravity. In this position, of course, the two corresponding stripper sleeves 51 are retained in their "up" position by reason of the fact that their cam rollers 57 are in engagement with the lower stationary cam plate 68 which prevents their vertical movement.

When shaft 58 is again raised, the two discs D are lifted from the dual feed unit 10 and into light contact with the lower edge of stripper sleeves 51. The discs D are held in this position by the resilient frictional engagement of plunger tips 49 throughout the next several index positions until they arrive in position over the indexing chain unit 80, soon to be described.

On the diametrically opposite side of the plunger head, and simultaneously with the pick up of two discs from the dual feed unit 10, similar steps are taking place to strip two adjacent discs D from their engagement on plunger tips 49 and deposit them onto the indexing chain unit 80. That is, the two advance plungers 47, with D discs held thereon, have been indexed to the position where the two sets of cam rollers 57 which actuate stripper sleeves 51 are now in engagement with lower cam segment 63. Thus, each descent of shaft 58 causes lower cam followers 55 to lower the two adjacent stripper sleeves 51, thereby stripping them in awaiting pockets on the indexing chain unit 80. The two corresponding plungers 48, however, are retained in their "up" position since on this side of the plunger head, the plunger cam rollers 54 are in engagement with the upper stationary cam plate 67.

Before proceeding to a description of the next main mechanism in the apparatus, which is the indexing chain 80, there remains an explanation of the motive power for the indexing turret 30. This is achieved by an endless chain 75 sprocket 36 on rotatable column 32, which chain in turn is driven from a sprocket associated with the drive mechanism for the indexing chain unit 80. An idler sprocket 76 mounted on a bracket 77 bolted to the main frame provides the necessary tensioning of chain 75. Thus, it is seen that the indexing motion of indexing turret 30 is directly synchronized to the indexing chain unit 80. The indexing turret 30 has been referred to above as having eight stations, but this means eight plunger units 47 each of which are indexed four times or to four different positions in one revolution of the turret. Thus, two discs D are received onto the two adjacent plungers at rest over the dual feed unit 10, and simultaneously two advanced discs D are deposited onto the indexing chain unit 80. This is a preferred arrangement, but it will be understood that a different number of disc feed slots, plungers and corresponding index positions may be used if desired.

Returning now to FIG. 1, the indexing chain unit 80 comprises an endless double-link chain 81 entrained on a driving sprocket 82 and two slightly smaller idler sprockets 83, 84, forming a triangular path of travel. Each sprocket is of double wheel construction (e.g. elements 82a and 82b in FIG. 6) having parallel rows of registered teeth to accommodate the two parallel link chains 81a and 81b of the double-link chain 81. Connected to every other link of upper chain 81a are L-shaped brackets 85 which project outwardly from the chain and move about the path of travel as integral parts of the chain. Bolted to the upright leg of each bracket 85 is an expandable cup 86 (see FIGS. 11 and 12) comprising a cup holder 87 and three arcuate segments 88 held in contracted relationship on the holder by an annular spring 89. Cup holder 87 has a flange portion 87a which bolts to the chain link, a base plate 87b, and an upstanding hollow ring 87c of a smaller diameter than the base plate and from which project three equally spaced radial guide pins 87d. Each cup segment 88 has an aperture 88a adjacent its bottom end which slidably receives a pin 87d, and a groove 88b adjacent its upper end which receives spring 89. Thus, the cup segments are retained as a unit on ring 87c and are radially expandable and contractable by reason of spring 89 when subjected to an application or release of an interior force. The upper interior wall of the segment 88 is inwardly and downwardly tapered, as at 88c, terminating in an annular lip 88d which receives the lower conical portion $D_1$ of disc D, for the purpose to be hereinafter explained.

Indexing chain unit 80 is advanced two cups at a time (i.e. a distance equal to the spacing between every third cup 86), by means of an intermittent gear unit 91 having a drive shaft 90 to which sprocket 82 is fixed. The drive for gear unit 91 is taken from the main machine drive (not 92 which turns a sprocket 93 shafted into the side of the gear unit 91. Also fixed on shaft 90 is a single wheel sprocket 94 which drives indexing turret 30 by means of endless chain 75, as hereinbefore described.

Adjacent that leg of the triangular path of travel of cups 86 which passes beneath plunger head 31 is a guide track 95 supported on the machine frame by a suitable bracket 96 bolted to the machine frame. The function of guide track 95 is to align the cups 86 accurately beneath the two adjacent plunger units 47 on turret 30 when the cups and plungers, with two discs D thereon, are intermittently arrested in registry at this station preparatory to the discs being stripped from plunger tips 49 into the two awaiting cups 86.

From this station, the cups 86 each now holding a disc D are advanced around sprockets 82, through the second leg of the triangular path of travel, and around idler sprocket 83 into the third and final leg of the path. At this station, the cups 86 intermittently advance onto a guide and support plate 97 bolted to the machine frame. The guide and support plate 97 comprises a base flange 97a secured to the machine frame, an elongate upright portion 97b of a length as substantially as long as the third leg of the path of travel of chain 81 between sprockets 83 and 84, a slot 97c the full length of said upright portion and opening to the upper surface thereof, and an elongate plate 97d projecting horizontally from upright portion 97b and having a plurality of equally spaced apertures 97e therein. Slot 97c is specially shaped to receive chain 81, in the disposition best shown in FIGS. 6 and 7, and thus guide the cups 86 in an accurate linear path in this leg of the triangular path of travel in much the same way as does the guide track 95 back at the indexing turret station in the first leg of the path. With the chain thus guided in slot 97c, cup holders 87 slide along the top surface of plate 97d and are arrested in accurate registry with apertures 97e each time the index movement of chain 81 is stopped. It will be seen from FIGS. 1 and 6 that at any one time, there are present on plate 97d six cups 86 each holding a disc D. These six discs are now ready to be removed from the cups by the next operation now to be described.

As best shown in FIGS. 6 and 7, the plate 97d directly overlies a plurality of male molding tools, in this case six mandrels 98, which are the standard elements of a high speed tube fabricating machine (not shown) which molds a thermoplastic headpiece on a preformed tube body. An example of this type of molding machine is described in U.S. Pat. 3,101,850, including the function and construction of the male tools such as mandrels 98. To enable their alignment beneath plate 97d at the appropriate interval, mandrels 98 are mounted on a suitable slide mechanism 99 which reciprocates in time with the feed of indexing chain unit 80 between the extended position illustrated in FIG. 6 and a retracted position suited to the rotary path of the molding machine. That is, when six cups 86 with discs D therein are in position on plate 97d, mandrels 98 have been slid into position beneath the plate in alignment with the cups and are ready to receive the discs, one on each mandrel.

To accomplish this transfer, disc inserting unit 100 is provided with vertically reciprocating means operable above plate 97d. This unit comprises a superstructure frame 101 fixed to the upper end of a hollow column 102 which is secured at its lower end to a collar 103 which forms a part of the machine frame. Extending through the column 102 are a pair of reciprocating rods 104 and 105 which are independently actuated by a suitable mechanism (not shown) driven from the main machine drive housed below indexing chain unit 80. The longer rod 104 is connected at its upper end to a crank 106, at a central pivot pin 107, which crank is pivotally connected by a pin 108 at one of its ends to frame 101. The shorter rod 105 is connected at its upper end to one end of a crank 109 by a pin 110, which crank 109 extends through a slot 102a in the column 102 and, in turn, is pivotally connected to frame 101 by a pin 111.

The end of crank 106 opposite pin 108 is forked into two crank arms 106a and 106b (FIG. 7), the ends of which are pivotally connected by links 112 to an upper cross bar 113 which cooperates in the actuation of a gang stripper-inserter mechanism 120, next to be described. The end of lower crank 109 opposite its connection with rod 105 also has two fork arms 109a and 109b (FIG. 7) which are connected by links 114 to a stripper carriage 115 which also cooperates in the actuation of mechanism 120.

The stripper-inserter mechanism 120 comprises six horizontally aligned plunger units 121 which are slidably supported by and reciprocate in vertically aligned apertures in horizontally spaced support members 101a and 101b formed as integral parts of superstructure frame 101. Plunger units 121 and the stripper carriage 115 combined make up the main elements of stripper-inserter mechanism 120.

Stripper carriage 115 comprises an upper cross member 116 and lower cross member 117 rigidly connected together by a plurality of spaced posts 118 bolted from opposite ends to each member. The carriage is supported on crank arms 109a and 109b by the links 114 which are pivotally connected to the lower cross member 117. A pair of spaced hollow guide columns 119 also connect the two cross members adjacent their opposite ends, to receive a pair of guide rods 122 which depend from support member 101b of the superstructure frame 101 to ensure the accurate alignment of the stripper mechanism in relation to the underlying cups 86 in position on plate 97d. Upper cross member 116 has six equally spaced oversized apertures 116a through which plunger units 121 freely pass, and lower cross member 117 has six equally spaced apertures 117a, vertically aligned with the apertures 116a in the upper cross member, in which are fixed six nose-shaped cams 123 which engage with and expand the cups 86 in the "down" position of the stripper carriage 115 in the manner soon to be described. It will be understood that the oscillation of crank 109, in response to up and down actuation of rod 105, serves to raise and lower carriage 115 and cams 123 between the "up" position (FIGS. 7 and 8) and the "down" position (FIGS. 9 and 10).

Each plunger unit 121 includes an elongate rod 125 slidably extending at its upper end through the aperture in upper support member 101a and adjacent its lower end through the aperture in lower support member 101b. Each rod 125 also extends through an aperture in upper cross bar 113 and is yieldably fixed thereto by means of a lock nut 126 threaded to the rod above the cross bar and spring 127 which rests on a collar 128 on the rod below the cross bar. The upper end of the spring 127 is held in a shallow recess 113a cut in the underneath side of cross bar 113. Thus, oscillation of crank 106 by actuation of rod 104 serves to move cross bar 113 with rods 125 connected thereto between the "up" position (FIGS. 7 and 8) and "down" position (FIG. 10) in cooperation with the up and down movement of stripper carriage 115. The throw or displacement of crank 106 is greater than that of crank 109, and, consequently, the downward movement of rods 125 exceeds the downward movement of cams 123, as is clearly seen by comparing FIGS. 9 and 10.

The lower end of each rod 125 carries an inserter mechanism 130 comprising a chuck 131 fixed to the lower end of an insulated shank 132 which in turn is pinned to an adapter 133 screwed into a bored and tapped hole in the end of rod 125. A collar 134 with a set screw 135 through the bored wall of shaft 125 prevents adapter 133 from coming loose. Shank 132 includes a hollow core 132a of electrical insulation material sheathed in an outer reinforcing jacket 132b. Chuck 131 is of electrically conductive material and is electrically connected to a contact ring 132c adjacent the top of shank 132 by means of a wire conductor 132d which extends through a groove 132e on the side wall of core 132a (FIG. 8). This arrangement provides an electric circuit capable of sensing a malfunction in the operation, in a manner to be explained in the description to follow of the disc stripping and inserting steps illustrated in FIGS. 8–10.

Disposed within shank 132 and adapter 133 is a slidable pin 136 having fixed to its lower end a tip 137 of resilient material, similar to plunger tip 49 on the indexing turret head 31. The tip 137 has an enlarged upper portion 137a which slides within a cylindrical bore 132f in the lower half of shank 132. The upper end of pin 136 has a cap 138 which acts upwardly against the pressure of a spring 138 set in the bored end of rod 125 above the screwed connection for adapter 133.

Referring now to the steps illustrated in FIGS. 8 and 9, cams 123 on carriage 115 and inserter mechanisms 130 descend substantially in unison, from their "up" position in FIG. 8 where the chucks 131 normally rest within the cams 123, to an intermediate "down" position shown in FIG. 9. At this point, which is the limit of downward movement of cams 123, the conical nose of each cam 123 has entered and contacted the inner tapered wall 88c of cup segments 88, forcing the cup segments to radially expand an amount sufficient to release disc D, which is only loosely held in the cup 8 during its travel from indexing turret 30, from its engagement on cup lip 88d. Plate 97d supports the cups 86 against the downward force of cams 131. Simultaneously, pin tip 137 has entered and frictionally engaged the interior surface of disc portion $D_2$, and chuck 131 has made light contact with the surface of conical disc portion $D_1$. The pressure of spring 139 above pin 136 is sufficient to overcome the slight resistance to resilient tip 137 entering the hollow disc portion $D_2$. It will be noted that the interior end surfaces of chuck 131 and core 132a are appropriately contoured to correspond to the upper surfaces of the disc D.

It will be appreciated that the timing of the independent movements of cams 123 and inserter mechanisms 130 are critical and must be closely adjusted to ensure that the discs D are not prematurely released from cups 86 until pin tips 137 have made positive engagement in disc portions $D_2$, thereby preventing the discs from falling freely through the expanded cups. Thus, the coacting cam surfaces of cams 123 and cup segments 88, in relation to the downward stroke of inserter mechanism 130, are designed to caue the full opening of segments 88 to be delayed just long enough to enable tip 137 to enter and firmly engage disc portion $D_2$. This relationship may be readily adjusted, of course, by appropriate adjustments in the setting of lock nuts 126. Also, the displacements of levers 106 and 109 may be adjusted to facilitate the setting of the proper limits of the separate movements.

Returning now to the next step illustrated in FIG. 10, inserter mechanism 130, now with a disc D firmly held by chuck 131 and resilient tip 137, continues through the still expanded cups 86 and onto the upper end of mandrel 98. As shown, the upper end of the mandrel has a shoulder position 98a and upstanding neck portion 98b which terminates in a smaller tip 98c. This configuration corresponds to the interior shape of disc D and, consequently, readily enters the disc from below as the disc is forced downwardly onto the mandrel. During this final downward movement, tip 137 strikes the mandrel tip 98c and is thereby arrested, because spring 139 collapses when the contact is made, whereas chuck 131 continues downward to strip the disc from tip 137 and press it firmly onto the mandrel shoulder 98a. Inserter mechanism 130 then is retracted through the cup 86, still held in expanded position by cams 123, and then returns with cam 123 to the "up" position of FIGURE 8. The mandrels 98 with discs D thereon are simultaneously shifted from below plate 97d into operative position on the molding machine. The cycle then repeats; i.e. the six succeeding cups 86 and discs D on chain 81 are intermittently advanced into position on plate 97d, a bank of six mandrels 98 shift again into position below the cups, and stripper-inserter mechanism 120 descends to release the discs D from the cups and place them on the mandrels. This means that the mandrel shift and disc stripping and inserting operations occur once for every three index movements of indexing chain unit 80. A different cycle is possible, of course, depending on the number of mandrels used on the molding machine.

In the event of a malfunction which results in the absence of a disc D being placed on one or more of the mandrels 98, electrically conductive chuck 131 physically contacts the metal mandrel 98 and thereby completes a circuit back through conductor 132d and contact ring 132c which in the "down" position makes contact with a spring type terminal 140 fixed by an insulated connection to upper cross member 116 adjacent each inserter mechanism 130. This sends a signal ahead to the molding machine which energizes suitable control means by which the mandrel missing a disc D is bypassed in the headpiece molding operation.

It will be noted the impact force of inserter mechanism 130, first on initial contact with disc D in the cup 86

(FIGURE 9) and then again when the disc is seated on mandrel shoulder 98a (FIGURE 10), is cushioned somewhat by reason of spring 127 through which the downward force of crank 106 is transmitted. This lessens the wear on the contacting surfaces of the respective components in these mechanisms, and also insures against accidental damage or breakage to the discs D during the stripping and inserting movements of FIGURES 9 and 10.

Also, the cams 123 and cup segments 88 are of a suitable durable but resilient material (e.g. "Nylatron") to lessen the impact shock and wear of these components. Preferably, plunger tips 49 in the indexing turret 30 and pin tips 137 in the inserter mechanisms 130 are of this same resilient, durable material. Cup segments 88 may be readily removed from cup holder 87 for replacement or size change, and, similarly, cams 123 are easily removed from their supporting apertures in lower cross member 117 by removal of split-ring washers 141 which retain the cams in locked position.

It is thought that the invention and many of its attendant advantages will be understood from the foregoing description and it will be apparent that various changes may be made in the form, construction, and arrangement of parts of the apparatus menttioned herein and in the steps and their order of accomplishment of the method described herein, without departing all of its material advantages, the apparatus and method hereinbefore described being merely a preferred embodiment thereof.

We claim:

1. An apparatus for feeding workpieces in an orderly grouping and positioning the grouped workpieces in an assembly station, comprising:
    (a) feed means for receiving a supply of workpieces and advancing them seriatim to a stationary position for transfer;
    (b) means for transferring individual workpieces from said feed means to a next advanced position;
    (c) an indexing unit operable in an endless path and having a plurality of spaced cup members for receiving individual workpieces, said indexing unit being intermittently driven in time with said transferring means to receive said workpieces seriatim in said cup members along one portion of its path during a period of arrest at said next advanced position and to position a group of said workpieces along an advanced portion of its path of travel during said period of arrest; and
    (d) gang means operable at said advanced portion of the path of travel of said indexing unit to strip said group of workpieces from the arrested cup members and position them on the awaiting tools of an assembly machine.

2. The apparatus of claim 1 wherein said feed means includes parallel feed channels and driven means for positively controlling the advance of said workpieces in each channel.

3. The apparatus of claim 2 wherein said transferring means includes a rotatable carriage and a plurality of reciprocatable plungers spaced thereabout, a set of said plungers being operable to extract the foremost workpieces from said feed channels during an arrest period of said carriage and another set of said plungers being operable simultaneously to place a like number of workpieces in said cup members.

4. The apparatus of claim 3 wherein said plungers include independently reciprocatable gripper and stripper members and actuating means for raising and lowering said members at appropriate intervals during the rotation cycle of said carriage, said gripper member being operable to engage and extract the foremost workpieces from said feed channels and said stripper members being operable to strip said workpieces from said gripper member and place them in said cup members.

5. The apparatus of claim 1 wherein said gang stripping means includes a plurality of reciprocatable plungers mounted in line over the advanced portion of the path of travel of said indexing unit in registry with the position of said arrested cups and said assembly tools, each of said plungers including independently reciprocatable cup release and cup stripper members, said cup release members being operable at an interim position in the downward stroke of said plungers to release said workpieces from said cup members and said cup stripper members being operable from said interim position to engage said workpieces and carry them downward from said cup members onto said awaiting assembly tools.

6. The apparatus of claim 5 wherein each said cup stripper member includes a yieldable means which moves downwardly in unison therewith for frictionally engaging said workpiece and holding it against the force of gravity, said yieldable means having a tip portion engageable with said assembly tool to cause said yieldable means to disengage from said workpiece as said workpiece is positioned on said tool by said cup stripper member.

7. The apparatus of claim 5 wherein each of said cup stripper members includes an electrically conductive surface at its lower end, and electrically conductive surface remote from said lower end and engageable with the terminal of a signal circuit, and a conductor connecting said surfaces, said surface at the lower end of said cup stripper member being engageable with said assembly tool in the absence of a workpiece on said tool, whereby to complete an electrical circuit and send a signal to said assembly machine to compensate for the absent workpiece.

8. The apparatus of claim 5 wherein cup members comprise yieldable segments which are normally contracted to a position for holding said workpieces and each said cup release member includes a cam portion which engages and expands said segments slightly in advance of the movement of said cup stripper member to free said workpiece for continued downward movement by said cup stripper member.

9. The apparatus of claim 1 wherein said gang means is operable to strip said group of workpieces from the arrested cup members once every "N" index movement of said indexing unit, where "N" is equal to the number of workpieces in said group divided by the number of workpieces delivered to said cup members by said transferring means in the interval between each index movement.

10. An apparatus for feeding hollow container components of a compound conical-cylindrical shape into an orderly grouping and for positioning the grouped components onto the tools of a container molding machine, comprising:
    (a) feed means for receiving a supply of components and advancing them seriatim in a row to a stationary transfer position;
    (b) transfer means for extracting the foremost components from said feed means, shifting them to a next advanced position and stripping them into awaiting component-receiving elements;
    (c) an indexing unit operable in an endless path and having, as said component-receiving elements, a plurality of spaced cups each adapted to receive and yieldably support an individual component, said indexing unit being intermittently driven in time with said transfer means to receive said components seriatim in said cups along one portion of its path of travel during a period of arrest at said next advanced position and to position a group of said components in said cups along an advanced portion of its path of travel in registry with said tools during said period of arrest; and
    (d) gang means operable at said advanced portion of the path of travel of said indexing unit and including a plurality of spaced reciprocatable plungers mounted in line over and in registry with said tools, said plungers including independently reciprocatable cup release and cup stripper members, said cup release members being operable at an interim position in the downward stroke of said plungers to expand said cups and release said components, said cup stripper members being operable from said interim position to engage said components and positively carry them downward onto said tools.

11. A mechanism for transferring workpieces from one position to another, comprising:
   (a) a rotatable carriage;
   (b) a plurality of reciprocatable plungers spaced about said carriage each including independently reciprocatable gripper and stripper members, said gripper members being operable at said one position during an interval of arrest of said carriage to engage and raise workpieces from an infeed station, said stripper members being operable at said another position during an arrest interval to disengage said workpieces from said gripper members; and
   (c) actuating means for controlling the movement of said plungers during the rotation and arrest of said carriage, said actuating means including:
      (i) cam followers on each of said gripper members and stripper members;
      (ii) a pair of spaced stationary cam plates for engaging said cam followers and maintaining said gripper and stripper members in an elevated position for a substantial portion of the rotative path of said carriage, one of said cam plates which engages the cam follower on said gripper member having a portion cut away corresponding to said one position and the other of said cam plates which engages the cam follower on said stripper member having a like portion cut away corresponding to said another position; and
      (iii) a pair of reciprocatable cam segments, one of said segments being operable within said cut away portion of said one cam plate to engage the cam follower on said gripper member and to lower and raise said gripper member during an arrest interval, the other of said segments being operable within said cut away portion of said other cam plate to engage the cam follower on said stripper member and to lower and raise said stripper member during an arrest interval.

12. In an apparatus for feeding workpieces of a hollow compound conical-cylinder shape onto the tools of an assembly machine wherein said workpieces are individually conveyed into spaced registry with said tools in expandable support cups, a reciprocatable plunger mechanism for stripping said workpieces from said cups and placing them on said tools comprising:
   (1) a cup release member having an annular cam at its lower end engageable with a surface of a said support cup;
   (2) a cup stripper member sleeved within said annular cam and having an annular chuck at its lower end engageable with the conical portion of said workpiece and an upwardly yieldable pin within said chuck, the lower end of said pin having a resilient tip frictionally engageable with the interior surface of the cylindrical portion of said workpiece; and
   (3) means for independently reciprocating said cup release member and said cup stripper member, said means including a first rocker member connected to said cup release member and being operable to reciprocate said cup release member between a normally elevated position and a down position where said annular cam engages and expands said support cup to release said workpiece, and a second rocker member connected to said cup stripper member and being operable to reciprocate said cup stripper member between a normally elevated position and a position beyond the down position of said cup release member to engage said said workpiece by said chuck and said resilient tip and carry said workpiece downward from said support cup onto a said tool, said first and second rocker members having relative actuation movements which enable the expandable engagement of said annual cam with said support cup slightly in advance of the engagement of said chuck with the conical portion of said workpiece.

13. A method of feeding workpieces in an orderly grouping and positioning the group workpieces in an assembly station comprising the steps of;
   (a) feeding said workpieces seriatim from a supply to a stationary transfer position;
   (b) transferring said workpieces individually from the supply path of travel to an arrested position contiguous a second path of travel.
   (c) intermittently advancing said workpieces along said second path of travel to form a grouping of said workpieces contiguous said assembly station; and
   (d) simultaneously shifting said grouped workpieces into said assembly station during an arrested interval between the intermittent advance.

14. The method of claim 13 wherein a plurality of said workpieces are simultaneously transferred to said second path of travel and the distance of each intermittent advance corresponds to the number of said plural workpieces.

15. The method of claim 13 wherein the grouped workpieces are shifted into said assembly station once every "N" intermittent advance along said second path of travel, where "N" is equal to the number of workpieces in said group divided by the number of workpieces transferred to said second path of travel in the interval between each intermittent advance.

16. The method of claim 13 including the step of detecting the absence of a workpiece in said grouping and causing a compensating signal.

17. A method of feeding workpieces of a hollow compound conical-cylindrical shape and positioning said workpieces on the tools of an assembly machine, comprising the steps of:
   (a) feeding said workpieces seriatim in a path of travel from a supply with the conical portion of each of said workpieces facing downwardly and the cylindrical portion facing upright;
   (b) transferring said workpieces individually onto expandable carriers moving in a second path of travel with the peripheral edges of said conical portions supported in said carriers;
   (c) intermittently advancing said carriers and supported workpieces along said second path of travel to from a grouping of said workpieces above said tools; and
   (d) shifting said grouped workpieces simultaneously from said carriers onto said tools during an arrest interval between the intermittent advance of said carriers, said shifting step including first expanding said carriers sufficiently to release said peripheral edges while substantially simultaneously positively gripping said cylindrical portions to support said workpieces against the force of gravity, and then positively lowering said workpieces onto said tools while simultaneously releasing the gripping support of said cylindrical portions just before said workpieces are finally seated on said tools.

References Cited
UNITED STATES PATENTS

| | | | |
|---|---|---|---|
| 3,302,278 | 2/1967 | Whitney | 29—429 |
| 3,466,731 | 9/1969 | Acton | 29—208X |

THOMAS H. EAGER, Primary Examiner

U.S. Cl. X.R.

29—208, 407